May 18, 1965
E. C. BROWN ETAL
3,184,076
AUXILIARY AXLE FOR VEHICLES
Filed May 23, 1963
3 Sheets-Sheet 1
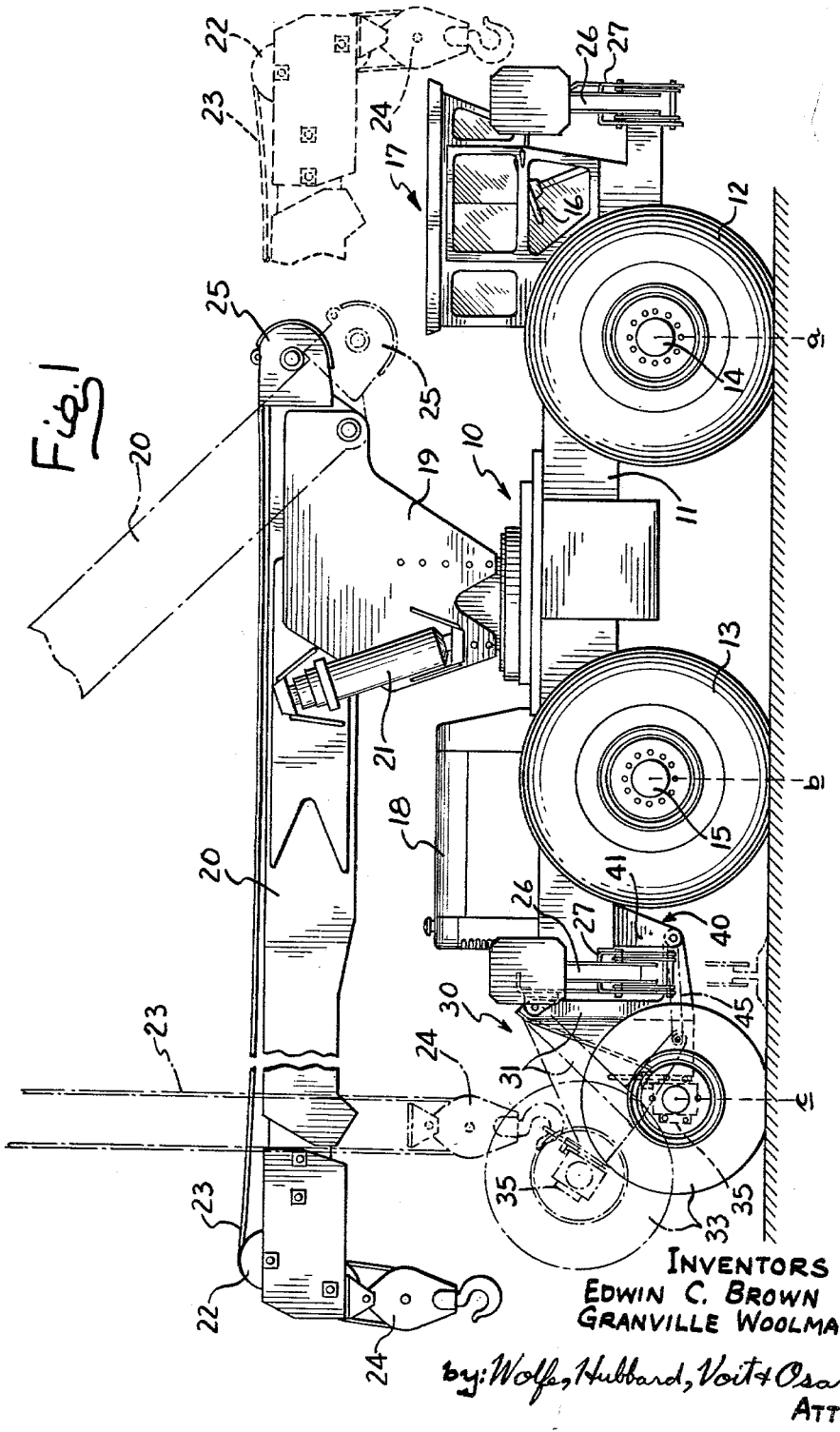
INVENTORS
EDWIN C. BROWN
GRANVILLE WOOLMAN
by: Wolfe, Hubbard, Voit & Osann
ATTYS.

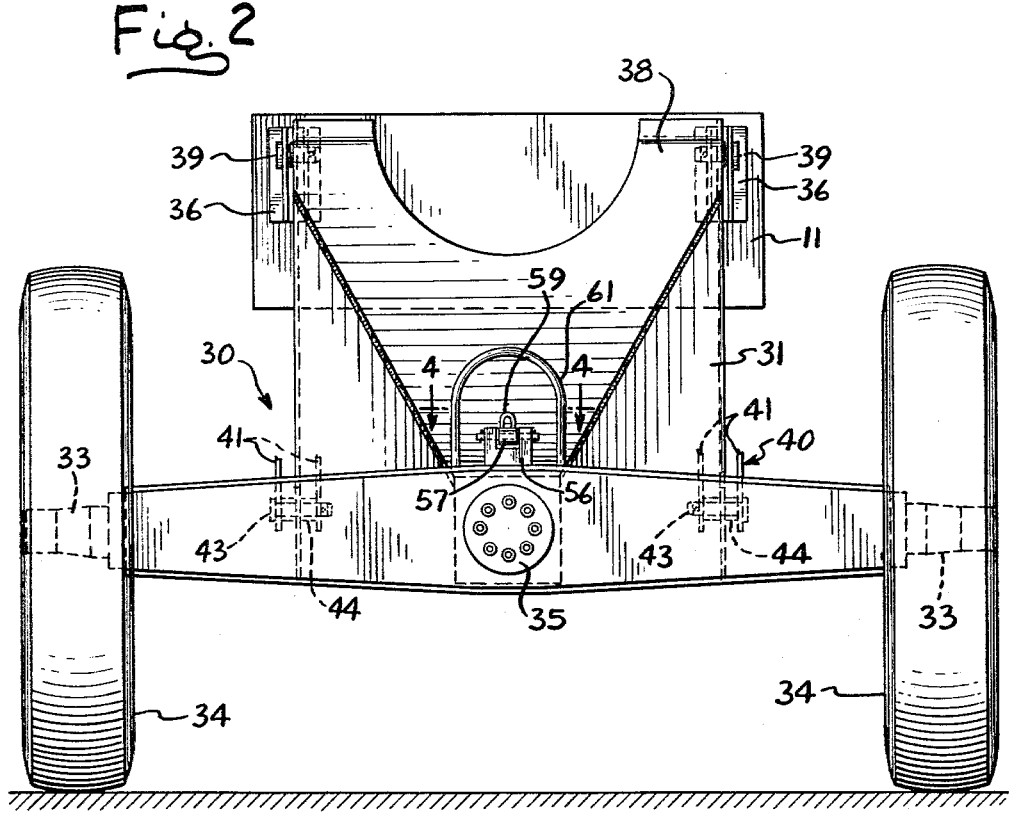
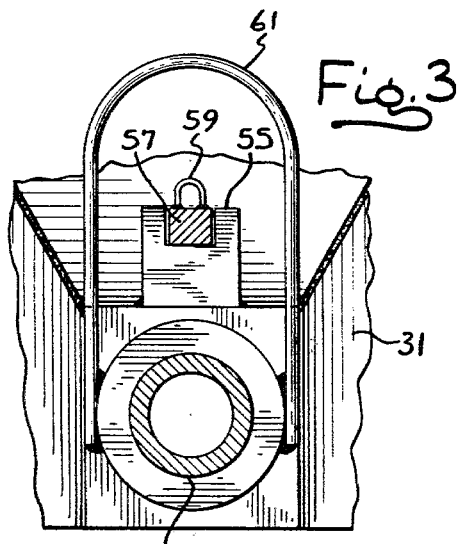
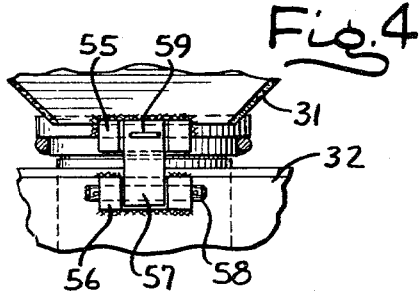

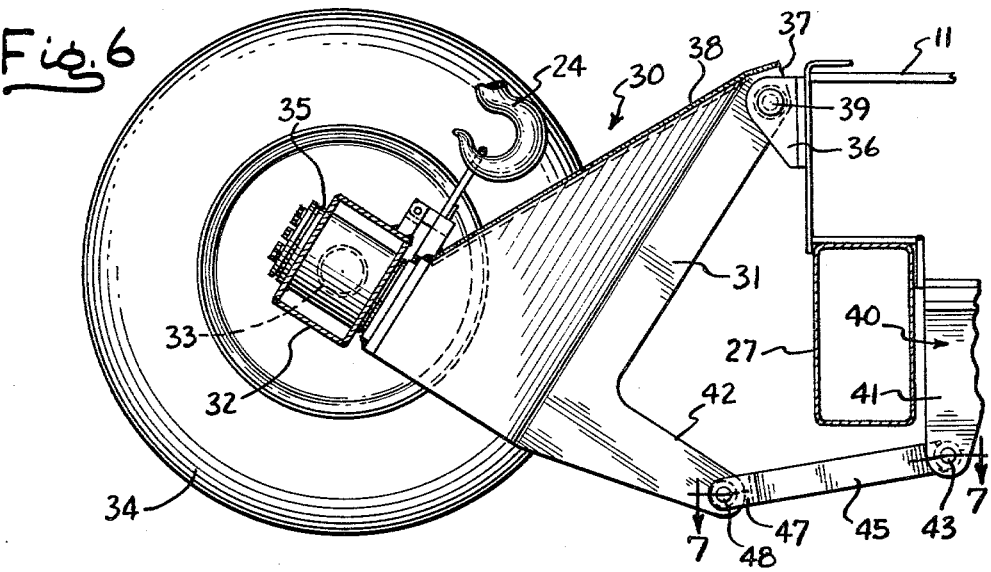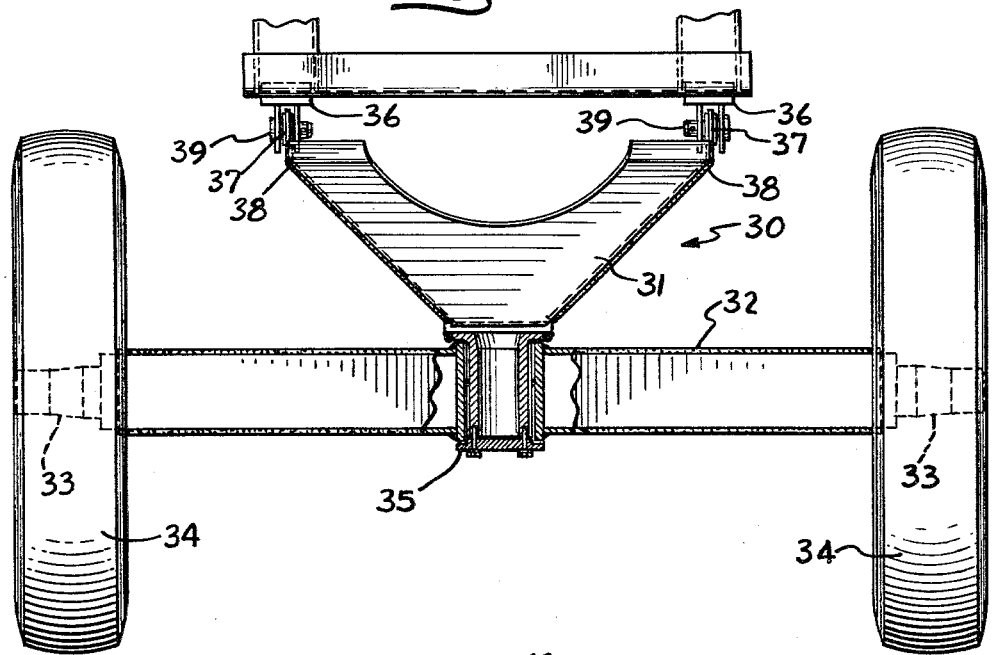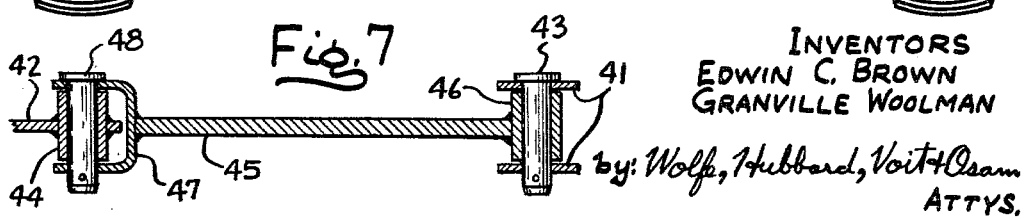

United States Patent Office 3,184,076
Patented May 18, 1965

3,184,076
AUXILIARY AXLE FOR VEHICLES
Edwin C. Brown, Aurora, and Granville Woolman, Naperville, Ill., assignors to Baldwin-Lima-Hamilton Corporation, a corporation of Pennsylvania
Filed May 23, 1963, Ser. No. 282,626
6 Claims. (Cl. 212—145)

This invention relates generally to vehicle axle assemblies and more particularly concerns a removable auxiliary axle for attachment to heavy construction type vehicles such as self-propelled cranes.

During recent years, material handling equipment has increased both in size and in lifting capacity. For example, hydraulically operated cranes mounted on rubber-tired chassis have now been developed which have lifting capacities in excess of 15 tons. Preferably, these cranes are mounted on four wheel drive, four wheel steer vehicles for maximum maneuverability and flexibility of operation. In addition, heavy power operated outriggers are customarily attached at each corner of these vehicles in order to provide the necessary stability for lifting large loads.

These large crane-type vehicles are well suited for operation at construction sites and loading docks. However, due to their heavy construction and corresponding large gross weight, they typically exceed both the gross vehicle and single axle weight limitations in most states. Therefore, it is necessary to obtain special permits each and every time these cranes are to be transported over the roads and highways in these states where the weight limitations are exceeded.

Accordingly, it is the primary aim of the present invention to provide a method and apparatus for reducing the weight loads on the front and rear axles of such construction type vehicles for road travel purposes.

It is a more particular object to provide a removable auxiliary axle for attachment to the chassis of a crane vehicle whereby a portion of the load on the front and rear wheels of the vehicle is transferred and supported by the wheels journalled on the auxiliary axle.

Another object is to provide means for mounting such an auxiliary axle on the vehicle chassis whereby it may be easily and conveniently secured in an upraised position with the auxiliary axle wheels located above the ground to permit maximum maneuverability of the vehicle at the work site.

A further object is to provide an auxiliary axle of the above type which can be easily installed on such a crane-type vehicle chassis through the use of the vehicle's own power operated crane boom. Still another object is to utilize the power operated outriggers of such a crane-type vehicle for relieving the weight on the rear axle of the vehicle while the auxiliary axle is locked in load supporting position.

A more detailed object is to provide an auxiliary axle as described above which is mounted for lateral oscillating movement to allow the auxiliary axle wheels to rise and fall with respect to the vehicle chassis when rough or uneven terrain is encountered. It is also an object to provide means for locking the auxiliary axle in its horizontal position to prevent lateral oscillation of the wheels when the axle is secured in its upraised position.

Other objects and advantages of the invention will become apparent upon reading the following detailed description and upon reference to the drawings, in which:

FIGURE 1 is a side elevation of a crane-type vehicle incorporating an auxiliary axle constructed in accordance with the present invention;

FIG. 2 is an end elevation of the auxiliary axle;

FIG. 3 is a fragmentary section of the auxiliary axle frame illustrating a portion of the swivel connection and lock for the auxiliary axle;

FIG. 4 is a fragmentary section of the lock shown in FIGS. 2 and 3 taken substantially along the line 4—4 in FIG. 2;

FIG. 5 is an enlarged plan view of the auxiliary axle with portions broken away;

FIG. 6 is an enlarged side elevation of the auxiliary axle shown in FIG. 5 with the axle housing shown in section; and FIG. 7 is a section of the connecting link taken substantially along the line 7—7 in FIG. 6.

While the invention will be described in connection with certain preferred embodiments and procedures, it will be understood that we do not intend to limit the invention to those embodiments and procedures. On the contrary, we intend to cover all alternatives, modifications and equivalents as may be included within the spirit and scope of the invention as defined by the appended claims.

Turning now to the drawings, there is shown in FIGURE 1 a large crane-type vehicle 10 with which the present invention is concerned. The crane 10 includes a chassis 11 supported by front wheels 12 and rear wheels 13, mounted on front and rear axles 14 and 15, respectively. Preferably, both the front and rear wheels are steerable, and a steering wheel 16 is located within an operator's station or cab 17 at the forward end of the crane chassis 11. In addition, the front wheels 12 as well as the rear wheels 13 are driven by a motor 18 mounted on the rear portion of the crane chassis. Thus, the crane 10 is a self-propelled, four-wheel steer and four-wheel drive vehicle.

Located between the front and rear axles of the crane 10, is a boom support 19 which is rotatably mounted on the crane chassis 11. The boom support 19 pivotally mounts a multiple section telescoping boom 20 which is adapted to be raised and lowered by a pair of hydraulic cylinders 21 (only one of which is shown) which interconnect the support 19 and boom 20. The projecting end of the boom 20 journals a pulley 22 over which a cable 23 is trained to support a hook block 24. Mounted on the rear end portion of the boom is a cable winch mechanism 25 for taking up and paying out the cable 23 in order to raise and lower the hook block 24.

In the illustrative crane 10, the telescopic boom 20 may be extended and retracted, as well as being raised and lowered as mentioned above. Moreover, the boom 20 and its support 19 may also be rotated through a complete circle by suitable means, such as a reversible hydraulic motor (not shown) mounted on the crane chassis. Desirably, the winch mechanism 25 is also driven by a reversible hydraulic motor mounted on the boom 20.

To control the various functions of raising and lowering, extending and retracting, and rotating the boom in either direction, as well as reversibly driving the winch motor, suitable control levers (not shown) are provided within easy reach of the crane operator within the cab 17. Thus, it will be appreciated that the crane 10 is an extremely versatile hydraulically controlled mechanism which has great flexibility of operation in that the boom 20 and its suspended hook block 24 can be positioned at any one of a wide range of locations with respect to the chassis 11. In addition, the four-wheel drive and four-wheel steer of the wheels 12, 13 enables the crane 10 to be quickly and conveniently maneuvered to the desired location at the work site.

In order to add greater stability to the crane 10 when lifting a heavy load with the boom 20, a power operated outrigger 26 is secured to each corner of the crane chassis. As seen in the solid line portion of FIG. 1, the outriggers are positioned in their upraised, or transport positions.

It will be understood, however, that each of the outriggers 26 may be lowered into ground engaging contact (as illustrated in the dash line showing of (FIG. 1) in order to relieve the load on the wheels 12, 13. The outriggers are preferably mounted in pairs, respectively, at the front and rear ends of the crane chassis 11 with each pair of outriggers secured to a heavy outrigger frame 27 detachably mounted on the chassis 11. In the present instance, each of the outriggers is, however, independently operated by separate hydraulic actuators contained within the frame 27 and under control of separate control levers (not shown) located within the operator's cab 17.

As will be understood by those familiar with this art, crane-type vehicles of the type illustrated may be constructed in many different sizes and styles. For example, many such cranes have been produced with a maximum lifting capacity of approximately five tons. In addition to these relatively light-weight cranes, however, there has recently been a trend toward the production of much larger self-propelled cranes with lifting capacities in excess of 15 tons. It is with these larger crane-type vehicles that the present invention is particularly concerned.

A typical crane of the type illustrated, which has a maximum lifting capacity in excess of 15 tons must, of course, be a relatively large and heavy piece of equipment in order to sustain the heavy loads and forces which it must support. Such an exemplary crane 10, which is constructed in a conventional manner and from conventional materials, has a gross weight of approximately 40,000 pounds, even when the cab 17, outriggers 26, and outrigger support frames 27 are removed to reduce the gross vehicle weight to a minimum. With the cab, outriggers and outrigger frames installed, the crane has a gross weight of approximately 45,000 pounds.

In the preferred embodiment, the crane 10 is designed so that the weight distribution on the front and rear axles 14, 15, indicated at $a$ and $b$, respectively, is approximately equal when the crane boom projects forwardly over the front wheels 12. In other words, the center of gravity of the crane 10 is approximately centered between the front and rear axles 14, 15 and the weight at each location is approximately 20,000 pounds when the cab 17, outriggers 26 and outrigger frames 27 are removed and with the tboom 20 positioned in the forwardly projecting or dash-line position in FIG. 1. With the addition of the cab, outriggers and outrigger frames, the weight distribution at $a$ and $b$ is approximately 23,000 and 22,000 pounds respectively. However, when the boom 20 is rotated to its rearwardly projecting or solid-line position as shown in FIG. 1, the center of gravity of the crane 10 is shifted toward the rear axle 14. Thus, weight at $a$ is reduced to below 18,000 pounds but the weight at $b$ is increased to more than 27,000 pounds for the fully equipped crane.

According to current highway statutes and ordinances in a great majority of states and localities, the gross vehicle weight limitation for a two axle vehicle, without special permit, is 36,000 pounds or less. Furthermore, the current maximum weight limitation per axle in a majority of states and localities, without special permit, is 18,000 pounds or less. Thus, even with the cab, outriggers and outrigger frames removed, the gross weight of the crane 10 exceeds this limitation in most states. In addition, although the weight per axle of the crane 10 is substantially equalized when the boom 20 is projected forwardly, the resulting per axle weight of approximately 20,000 pounds exceeds this limitation in most states. When the cab, outriggers and outrigger frames are installed, the gross vehicle weight of approximately 45,000 pounds exceeds the current maximum limitation in all but one state. Moreover, while swinging the boom 20 to the rear reduces the front axle weight to below 18,000 pounds (with or without cab, outriggers and frames installed, the greatly increased rear axle weight exceeds the allowable limit in nearly all of the states.

It will be appreciated from the above that a highway permit must be obtained in order to move the crane 10 by its own power over the roads and highways of most of the states in order to get to different work sites. Alternatively, of course, it is possible to load the crane 10 on an equipment carrier having the necessary number of axles and appropriate axle distribution to comply with the weight limitations of the various states and localities. However, it will also be appreciated that the practice of either of these two alternatives entails frequent delays, expense and inconvenience to the crane operator and owner. In order to overcome this problem, it is necessary to reduce the per axle weight of the crane to below 18,000 pounds.

In accordance with the present invention, the weight on the front and rear axles 14, 15 of the crane 10 is reduced to below the statutory maximum in most states by the addition of an auxiliary axle unit 30. As shown in the solid line representation in FIG. 1, the auxiliary axle unit 30 is adapted to be trailingly mounted on the crane chassis 11 behind the rear wheels 13 in order to support a portion of the crane weight, as indicated at $c$. With the auxiliary axle unit attached in its supporting position and the boom 20 swung rearwardly, the resulting weight distribution of the crane 10 is approximately 17,750; 17,500 and 12,000 at $a$, $b$ and $c$, respectively. In other words, the weight per axle is reduced to below 18,000 pounds. Moreover, the crane 10 which now has a gross weight of approximately 47,000 pounds, including the weight of the auxiliary axle, is rated as a three axle vehicle and therefore is within the maximum gross weight limitation for such vehicles in most states.

As shown in more detail in FIGS. 2, 5 and 6, the auxiliary axle unit 30 includes a support frame 31 which carries an axle housing 32 on which a pair of stub axles 33 are mounted for journalling auxiliary wheels 34. Preferably, the axle housing 32 is of the unsprung laterally oscillating type and is journalled at its midpoint to a bearing hub 35 secured to the frame 31. This construction permits the auxiliary wheels 34 to rise and fall upon encountering irregularities in the ground, in similar fashion to the rear wheels 13, which are also mounted for lateral oscillation. The frame 31 is, of course, a relatively heavy structure which is fabricated of steel plates and, as illustrated, has a generally triangular configuration when viewed from the top (FIG. 5) or side (FIG. 6).

In the preferred embodiment, the auxiliary axle unit 30 is detachably mounted on the chassis 11 for pivotal movement about a substantially transverse horizontal axis so that the axle unit 30 may be swung to an upraised position, as shown in the dash line representation of FIG. 1, or alternatively, may be completely removed from the crane 10. For pivotally mounting the frame 31 in trailing relationship behind the rear axle 15 of the crane 10, a pair of heavy brackets 36 are secured to the rear end of the chassis 11. Each of the brackets 36 is desirably generally channel shaped in order to receive a projecting lug 37 formed integrally on each upper leg 38 of the trangular frame 31. The brackets 36 and lugs 37 are suitably apertured for reception of connecting pins 39 on which the frame 31 is hinged.

To couple the auxiliary axle unit 30 in its lowered or weight bearing position, as shown in the solid line representation of FIG. 1, a pair of arms 40 are mounted on the crane chassis 11 just ahead of the rear outrigger frame 27. Desirably, the arms 40 are each formed with rigid side plates 41 which are spaced to receive a forwardly projecting leg 42 formed integrally on the lower side portions of frame 31. The side plates 41 are each suitably apertured for reception of lower connecting pins 43 which are insertable through reinforcing collars 44 secured to the legs 42.

When there is no need for reducing the weight on the front and rear axles 14, 15 of the crane 10, the auxiliary axle unit 30 may be swung upwardly and retained in an upraised position with the wheels 34 positioned well above the ground (see FIG. 6). For this purpose, spacer links 45 are provided for insertion between the arms 40 and legs 42. As shown in FIG. 7, the spacer links 45 are formed having a collar 46 at one end and a V-shaped bracket 47 at the opposite end. In this way, the collar 46 can be secured between the side plates 41 of the arms 40 by the lower connecting pins 43, and the collars 44 of the legs 42 can be secured to the brackets with additional connecting pins 48. It will be appreciated, of course, that with the auxiliary wheels 34 in their upraised position, the crane 10 is much more maneuverable as a four-wheel drive, four-wheel steer vehicle.

To prevent the auxiliary axle housing 32 and wheels 34 from laterally oscillating when the axle unit 30 is in its upraised position, as shown in FIG. 6, means are provided for locking the housing 32 to the frame 31. As shown in FIGS. 3 and 4, the locking means in the illustrated embodiment includes a pair of U-shaped brackets 55 and 56, respectively secured to the frame 31 and housing 32. For interconnecting the brackets, a latch bar 57 is pivotally mounted on a transverse pin 58 located in one of the brackets 56. The bar 57 carries a lifting eye 59 to permit the bar to be easily swung from its illustrated (FIGS. 2-4) locked position to an unlocked position wherein the bar 57 pivots on the pin 58 clear of the bracket 55. It can be seen that the brackets 55, 56 are located so as to secure the axle housing, against rotation about the bearing hub 35, in a substantially horizontal position when the latch bar 57 is placed in its locked position interconnecting the brackets.

In accordance with another aspect of the present invention, the auxiliary axle unit 30 may be lifted on and off the crane 10, as well as raised and lowered between the positions illustrated in FIG. 1, by the use of the crane boom 20 and hook block 24. In order to accomplish this, a lifting handle 61 is secured to the axle support frame 31. In the preferred embodiment, the handle 61 is a relatively large and heavily constructed bail-like hoop which permits easy attachment of the hook 24. To permit easy alignment of the frame 31 for insertion of the connecting pins 39, the handle 61 is desirably located at the center of gravity of the auxiliary axle unit 30. This enables the crane operator or an attendant to tilt or swing the relatively heavy auxiliary axle unit into place without the exertion of undue effort.

Returning to FIGURE 1 for a moment, there is shown a fragmentary, dash line illustration of the crane boom 20 in its upraised position with the handle 61 of the auxiliary axle unit coupled to the hook block 24 which is suspended by the cable from the end of the boom. It will be understood, of course, that after the connecting pins 39, 43 are removed the hook block 24 may be raised by taking up the cable 23 on the winch mechanism 25. By appropriately swinging the crane boom to the desired location, the auxiliary axle unit 30 may then be placed on the ground or on a truck alongside the crane 10.

Pursuant to another feature of the present invention, the power operated outriggers 26 located at the rear of the crane chassis 11 are utilized to relieve the weight on the rear axle wheels 13 when the auxiliary axle unit 30 is being secured in its load bearing position. Thus, it will be appreciated that with the auxiliary axle unit 30 in its upraised position, as shown in the dash like representation of FIG. 1, the rear outriggers 26 are lowered into ground engaging contact (also shown in dash lines) and the hook block 24 is coupled to the hoop 61. By slightly raising the hook block and auxiliary axle frame the links 45 may easily be removed simply by withdrawing the connecting pins from which the binding forces have been relieved. Lowering the hook block permits the auxiliary axle unit to rotate downwardly and since the rear end portion of the crane chassis 11 is supported with the rear wheels 13 raised off the ground by the rear outriggers 26, the legs 42 may be quickly and easily pinned to the arms 41.

Following the insertion of the connecting pins 43 to secure the auxiliary axle unit 30 to the crane chassis 11 in its load bearing position, the outriggers 26, of course, may be raised to their transport position. The crane boom 20 may then be lowered from its dash line position as shown in FIG. 1 and the cable taken up by the winch mechanism so that the boom and hook block are located substantially as shown in the solid line position of FIG. 1. The lock bar 57 is, of course, swung out of engagement with the bracket 55 to permit lateral oscillation of the auxiliary axle housing 32 and wheels 34. The crane 10 is then ready to move from one job site to another.

From the foregoing, it will be readily appreciated that the addition of the auxiliary axle unit 30 permits the crane 10 to travel on the roads and highways of most states without the necessity of obtaining a special permit. In addition, the ease with which the auxiliary axle unit can be installed and removed with the aid of the boom 20 and rear outriggers 26 should also be apparent. Moreover, the auxiliary axle may be simply lifted to its upraised position and supported by the links 45 when maneuverability of the crane 10 is desired for short periods of time.

Since the auxiliary axle unit can laterally oscillate, the crane 10 can be driven at moderate speeds on the road. The simple but rugged construction of the unit 30 also makes it especially suited for long and troublefree use with a minimum of maintenance and care. Moreover, these same features contribute to the efficient and economical construction of the auxiliary axle unit since there are few critical tolerances which must be observed.

We claim as our invention:

1. In a crane-type vehicle having an unsprung chassis supported by front and rear wheels, the combination comprising, a pair of outriggers mounted on said chassis behind said rear wheels, means for lowering said outriggers into ground engaging contact to relieve the load supported by said rear wheels, a frame mounted in trailing relation about a transverse horizontal axis on said chassis, an auxiliary axle mounted on said frame and journalling a pair of spaced-apart support wheels, said frame being swingable about said axis between an upraised position whereby said support wheels are raised above the ground and a lowered position wherein said support wheels are located in ground engaging contact, a link adapted to interconnect said frame and said chassis to secure said frame in said upraised position whereby said support wheels are raised above the ground, means interconnecting said frame and said chassis for securing said frame in said lowered position when said load on said rear wheels is relieved by said outriggers, and means for raising said outriggers whereby a portion of said load is transferred to said support wheels.

2. An auxiliary axle assembly for a crane-type vehicle having an unsprung chassis supported by front and rear wheels comprising, in combination, a frame trailingly mounted on said chassis, said frame being pivoted for vertical swinging movement between an upraised position and a lowered position, an axle carried by said frame and journalling a pair of spaced-apart support wheels, means for securing said frame to said chassis in said lowered position whereby a portion of the load on said rear wheels is transferred to said support wheels, said axle pivotally mounted on said frame about a longitudinal axis for lateral oscillating movement, a link adapted to interconnect said frame and said chassis to secure said frame in said upraised position whereby said support wheels are raised above the ground, and means for interconnect said axle and said frame to restrain said lateral oscillating movement of said axle about said longitudinal axis when said frame and axle are in said upraised position.

3. The combination defined in claim 2 wherein said axle is provided with a substantially rigid, unsprung housing for supporting said spaced-apart wheels and said axle housing is journalled substantially at the midpoint threreof on a bearing hub secured to said frame to permit said lateral oscillating movement about said longitudinal axis.

4. In a crane-type vehicle having front and rear wheels supporting an unsprung chassis on which a rotatable crane boom is mounted, the combination comprising, a frame pivotally mounted in trailing relation about a transverse horizontal axis on said chassis, an auxiliary axle mounted on said frame and journalling a pair of spaced-apart support wheels, means including said boom for swinging said frame about said axis between an upraised position and a lowered position, a link adapted to interconnect said frame and said chassis to secure said frame in said upraised position whereby said support wheels are raised above the ground, outriggers for raising and lowering said chassis, and means for substantially rigidly securing said frame to said chassis in said lowered position when said chassis is raised by said outriggers whereby a portion of the load on said rear wheels is transferred to said support wheels when said chassis is lowerd by said outriggers.

5. The combination defined in claim 4 wherein the projecting end of said crane boom journals a pulley over which a cable is trained, a hook block supported by said cable, a cable winch mechanism mounted on said boom for taking up and paying out said cable in order to raise and lower said hook block, and a lifting handle secured to said frame adjacent said auxiliary axle and between said spaced-apart wheels, said handle adapted for engagement by said hook block whereby said frame and axle may be raised and lowered by said cable winch.

6. The combination defined in claim 4 wherein said crane boom has substantial weight and is mounted on said chassis for rotation about a substantially vertical axis, said boom being positioned on said chassis to locate the center of gravity of said vehicle and boom substantially at the midpoint between said front and rear wheels when said boom is rotated to project between said front wheels, said center of gravity being located substantially rearwardly of said midpoint when said boom is rotated to project between said rear wheels, and said auxiliary axle when in said lowered position adapted to relieve a substantial portion of the load of said vehicle and said boom from said rear wheels and transferring said portion of the load to said support wheels whereby said front and rear wheels then support substantially equal loads when said boom is oriented to project between said rear wheels.

References Cited by the Examiner
UNITED STATES PATENTS

| | | |
|---|---|---|
| 1,981,593 | 11/34 | Fageol. |
| 2,156,183 | 4/39 | King _____ 214—85.1 |
| 2,659,446 | 11/53 | Willock. |
| 2,663,433 | 12/53 | Le Clair _____ 212—145 |
| 2,878,032 | 3/59 | Hawke _____ 280—112 |
| 2,902,289 | 9/59 | North. |
| 2,943,865 | 7/60 | Fite. |
| 2,974,976 | 3/61 | Lyall. |
| 3,020,858 | 2/62 | Perkins _____ 212—145 |
| 3,068,021 | 12/62 | Ulinski _____ 280—111 |
| 3,096,887 | 7/63 | Thomas _____ 212—145 |

SAMUEL F. COLEMAN, *Primary Examiner.*

ANDRES H. NIELSEN, ROBERT B. REEVES,
*Examiners.*